United States Patent
Gao

(10) Patent No.: US 9,237,390 B2
(45) Date of Patent: Jan. 12, 2016

(54) ELECTROMAGNETIC TRANSDUCER

(71) Applicant: Kaiyan Gao, Shenzhen (CN)

(72) Inventor: Kaiyan Gao, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 74 days.

(21) Appl. No.: 14/273,674

(22) Filed: May 9, 2014

(65) Prior Publication Data

US 2014/0334655 A1 Nov. 13, 2014

(30) Foreign Application Priority Data

May 10, 2013 (CN) ...................... 2013 2 0253754 U

(51) Int. Cl.
*H04R 1/02* (2006.01)
*H04M 1/03* (2006.01)

(52) U.S. Cl.
CPC .............. *H04R 1/028* (2013.01); *H04M 1/035* (2013.01); *H04R 2400/01* (2013.01); *H04R 2499/11* (2013.01)

(58) Field of Classification Search
CPC .............................. H04R 2499/11; H04R 5/02
USPC ........................................................ 381/334
See application file for complete search history.

(56) References Cited

U.S. PATENT DOCUMENTS

| | | |
|---|---|---|
| 3,984,629 A | 10/1976 | Gorog |
| 4,030,209 A | 6/1977 | Dreidling |
| 4,057,784 A | 11/1977 | Tafoya |
| 4,162,405 A | 7/1979 | Chance |
| 4,213,678 A | 7/1980 | Pomerantzeff |
| 4,315,318 A | 2/1982 | Kato |
| 4,510,938 A | 4/1985 | Jobsis |
| 4,669,467 A | 6/1987 | Willet |
| 4,799,103 A | 1/1989 | Mucherheide |
| 4,846,183 A | 7/1989 | Martin |
| 4,899,756 A | 2/1990 | Sonek |
| 4,926,867 A | 5/1990 | Kanda |
| 5,074,642 A | 12/1991 | Hicks |
| 5,088,493 A | 2/1992 | Giannini |
| 5,103,497 A | 4/1992 | Hicks |
| 5,174,298 A | 12/1992 | Dolfi |
| 5,184,188 A | 2/1993 | Bull |
| 5,222,495 A | 6/1993 | Clarke |
| 5,371,347 A | 12/1994 | Plesko |
| 5,436,655 A | 7/1995 | Hiyama |
| 5,494,032 A | 2/1996 | Robinson |
| 5,497,769 A | 3/1996 | Gratton |
| 5,542,421 A | 8/1996 | Erdman |
| 5,610,387 A | 3/1997 | Bard |
| 5,625,458 A | 4/1997 | Alfano |
| 5,655,530 A | 8/1997 | Messerschmidt |

(Continued)

FOREIGN PATENT DOCUMENTS

WO    WO 2005053773    6/2005

*Primary Examiner* — Simon King
(74) *Attorney, Agent, or Firm* — IPro, Inc.; Na Xu

(57) ABSTRACT

An electromagnetic transducer is disclosed. The transducer includes a bracket, a magnetic circuit part receiving in the bracket and having a weight, a voice generating part actuated by the magnetic circuit part for generating sound, the magnetic circuit part sandwiched by two spring-plates for vibrating along a direction. The weight further includes a plurality of supporting protrusions for anchoring the two spring-plates, respectively. Each of the two spring-plates has a ring plane lamina and two helical wound springs extending inwardly from the ring plane lamina.

20 Claims, 3 Drawing Sheets

(56) References Cited

U.S. PATENT DOCUMENTS

| | | |
|---|---|---|
| 5,716,796 A | 2/1998 | Bull |
| 5,758,650 A | 6/1998 | Miller |
| 5,814,040 A | 9/1998 | Nelson |
| 5,946,220 A | 8/1999 | Lemelson |
| 5,966,204 A | 10/1999 | Abe |
| 5,995,866 A | 11/1999 | Lemelson |
| 6,006,126 A | 12/1999 | Cosman |
| 6,101,036 A | 8/2000 | Bloom |
| 6,122,042 A | 9/2000 | Wunderman |
| 6,132,379 A | 10/2000 | Patacsil |
| 6,171,301 B1 | 1/2001 | Nelson |
| 6,230,046 B1 | 5/2001 | Crane |
| 6,240,309 B1 | 5/2001 | Yamashita |
| 6,305,804 B1 | 10/2001 | Rice |
| 6,353,753 B1 | 3/2002 | Flock |
| 6,436,655 B1 | 8/2002 | Bull |
| 6,523,955 B1 | 2/2003 | Eberl |
| 6,599,247 B1 | 7/2003 | Stetten |
| 6,631,286 B2 | 10/2003 | Pfeiffer |
| 6,755,789 B2 | 6/2004 | Stringer |
| 6,777,199 B2 | 8/2004 | Bull |
| 6,845,190 B1 | 1/2005 | Smithwick |
| 7,092,087 B2 | 8/2006 | Kumar |
| 7,113,817 B1 | 9/2006 | Winchester |
| 7,158,859 B2 | 1/2007 | Wang |
| 7,376,456 B2 | 5/2008 | Marshik-Geurts |
| 7,545,837 B2 | 6/2009 | Oka |
| 7,559,895 B2 | 7/2009 | Stetten |
| 7,579,592 B2 | 8/2009 | Kaushal |
| 7,792,334 B2 | 9/2010 | Cohen |
| 7,904,139 B2 | 3/2011 | Chance |
| 7,966,051 B2 | 6/2011 | Xie |
| 8,032,205 B2 | 10/2011 | Mullani |
| 8,630,465 B2 | 1/2014 | Wieringa |
| 2001/0006426 A1 | 7/2001 | Son |
| 2001/0056237 A1 | 12/2001 | Cane |
| 2002/0188203 A1 | 12/2002 | Smith |
| 2003/0052105 A1 | 3/2003 | Nagano |
| 2003/0120154 A1 | 6/2003 | Sauer |
| 2003/0156260 A1 | 8/2003 | Putilin |
| 2005/0033145 A1 | 2/2005 | Graham |
| 2005/0085802 A1 | 4/2005 | Gruzdev |
| 2005/0154303 A1 | 7/2005 | Walker |
| 2005/0187477 A1 | 8/2005 | Serov |
| 2005/0265586 A1 | 12/2005 | Rowe |
| 2006/0007134 A1 | 1/2006 | Ting |
| 2006/0020212 A1 | 1/2006 | Xu |
| 2006/0052690 A1 | 3/2006 | Sirohey |
| 2006/0100523 A1 | 5/2006 | Ogle |
| 2006/0151449 A1 | 7/2006 | Warner |
| 2006/0206027 A1 | 9/2006 | Malone |
| 2007/0070302 A1 | 3/2007 | Govorkov |
| 2007/0102270 A1* | 5/2007 | Takashima ............... G06F 3/016 200/83 R |
| 2007/0176851 A1 | 8/2007 | Wiley |
| 2009/0018414 A1 | 1/2009 | Toofan |
| 2009/0171205 A1 | 7/2009 | Kharin |
| 2010/0061598 A1 | 3/2010 | Seo |
| 2011/0243367 A1* | 10/2011 | Lee ....................... H04R 9/066 381/398 |
| 2013/0076162 A1* | 3/2013 | Papakyriacou ......... B06B 1/045 310/25 |
| 2013/0331823 A1* | 12/2013 | Askem ................... F04B 49/06 604/543 |

* cited by examiner

ELECTROMAGNETIC TRANSDUCER

RELATED PATENT APPLICATIONS

This application claims the priority benefit of Chinese Patent application Filing Serial Number CN 201320253754.9, filed on May 10, 2013, the disclosures of which are herein incorporated by reference in its entirety.

FIELD OF THE INVENTION

The present disclosure relates to transducers to be mounted in terminal equipments for converting electrical signals to audible sounds, and more particularly to an electromagnetic transducer.

DESCRIPTION OF RELATED ART

With the rapid development of the portable devices such as cellular phones, people request for more and more functions. In the field of music enjoying of the cellular phone, a multi-function device enabling providing both audible and tactile sensations for amusement has already been widely used, which boosts the quick development of multifunctional devices.

An electromagnetic transducer related to the present invention comprises a bracket, a magnetic circuit part received in the bracket, and an assistant part connecting to the bracket. The magnetic circuit part includes a single magnet and a single magnetic frame corporately forming a magnetic circuit. The magnetic frame is assembled with the assistant part so that the magnetic circuit part is suspended in the bracket by the assistant part. Elastic plate are generally used as a part of the assistant part, and the magnetic circuit part could vibrate in corresponding range of frequencies actuating by the elastic deformation of the elastic plate. In recent years, it has been the market tendency to make electronic apparatus thinner and smaller and to provide electronic telecommunication apparatus with user-friendly operation interfaces. A vibrating member for providing tactile sensation in the electromagnetic transducer needs sufficient vibration amplitude for ensuring good performance.

However, the above mentioned elastic plate typically enable generating deformation only along one direction, which limits the vibrating amplitude of the vibrating unit, and leads to damage of inner components of the vibrator during falling off. As the vibration amplitude is restricted, sound performance, or vibration performance of the transducer cannot satisfy the requirements.

Therefore, it is necessary to provide a new electromagnetic transducer for solving the problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiment.

DETAILED DESCRIPTION OF THE EMBODIMENT

Reference will now be made to describe the exemplary embodiment of the present invention in detail.

Figure 1:
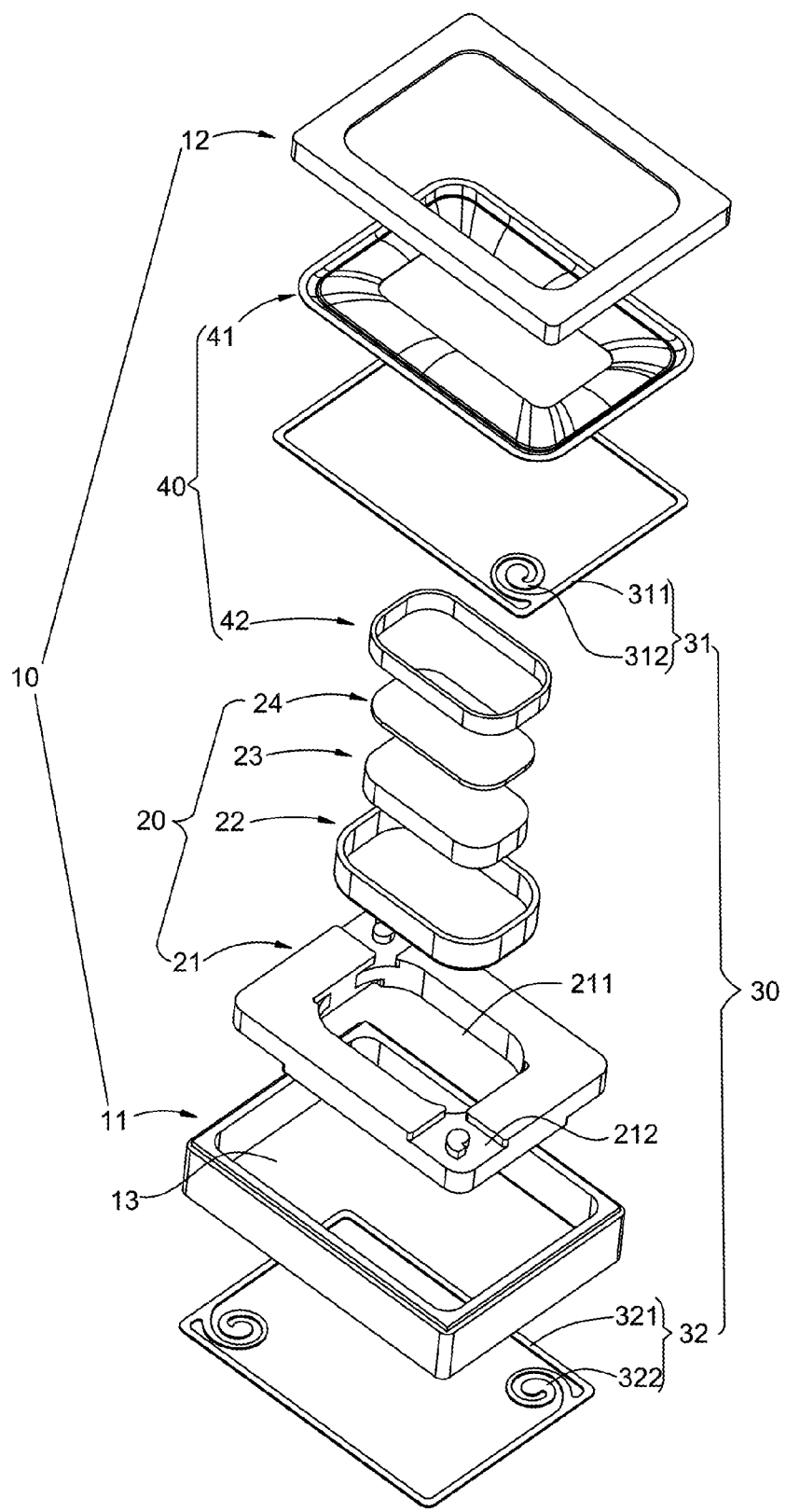
FIG. 1 is an isometric exploded view of an electromagnetic transducer in accordance with an exemplary embodiment of the present disclosure.

Referring to FIG. 1, an electromagnetic transducer 100 comprises a housing 10 including a cavity 13, a magnetic circuit part 20 suspended in the housing 10, an elastic element 30 assembled in the housing 10 for suspending the magnetic circuit part 20 in the cavity 13, and a voice generating part 40 actuated by the magnetic circuit part 20. The voice generating part 40 comprises a diaphragm 41 supported by the housing 10, and a voice coil 42 connected directly or indirectly with a lower surface of the diaphragm 41 and actuated by the magnetic field generated by the magnetic circuit part 20. In this embodiment, the housing 10 includes a rectangular tubular bracket 11 for covering an outer periphery of magnetic circuit part 20 and a cover 12 for protecting an upper surface of the diaphragm 41. The cover 12 is joined with the periphery of the diaphragm 40. The electromagnetic transducer 100 enables generating both sound and vibration.

The magnetic circuit part 20 includes a weight 21, a yoke 22, a magnet 23 and a pole plate 24. The weight 21 surrounds the yoke 22 for enhancing the vibrating amplitude of the magnetic circuit part 20. The magnet 23 is positioned on a central part of a bottom wall of the yoke 21. The pole plate 24 is oblong and laminar, and attached to a top surface of the magnet 23. A magnetic gap 25 is formed by an outer surface of the magnet 23 and an inner surface of the yoke 22. The voice coil 42 is partially received in the magnetic gap 25. In the embodiment, the elastic element 30 includes a first spring-plate 31 and a second spring-plate 32. The first and second spring-plates 31, 32 are mounted on both sides of the weight 21. In other words, the weight 21 is sandwiched between the first spring-plate 31 and the second spring-plate 32.

Figure 2:
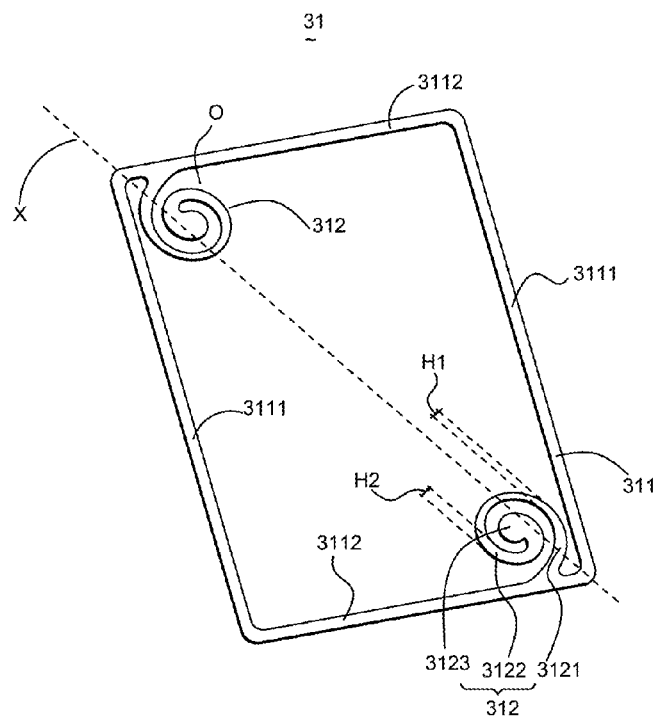
FIG. 2 is an isometric view of a spring-plate of the electromagnetic transducer shown in FIG. 1.
Figure 3:
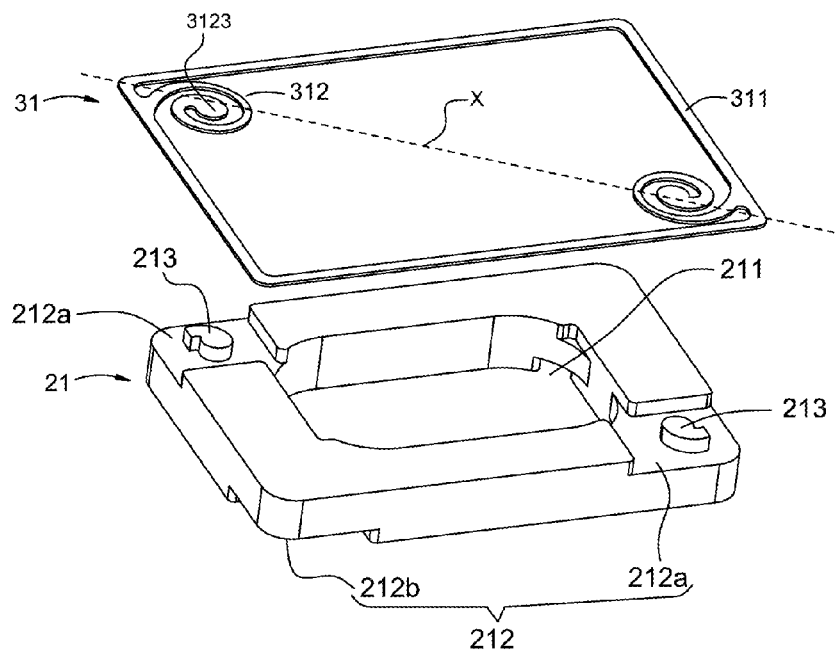
FIG. 3 is an isometric exploded view of one of the spring-plates ready to be mounted to a weight of the electromagnetic transducer in FIG. 1.

Referring to FIGS. 1 through 3, the structure of the first spring-plate 31 is similar to the second spring-plate 32 in the present embodiment. Referring especially to FIG. 2, any one of the two spring-plates 31, 32 has a rectangular outside shape which has a ring plane lamina 311, and two helical wound springs 312 projecting from diagonal corners O of the ring plane lamina 311, respectively. In the present embodiment, FIG. 2 illustrates only two helical wound springs 312 disposed on one spring-plate, in fact, the amount of the helical wound springs is not limited to two, and may be adjusted according to actual requirements. In general, the ring plane lamina 311 has a rectangular outside shape which has two long-sides 3111 and two short-sides 3112. A direction X is defined along one of the diagonals of the ring plane lamina 311. The two helical wound springs 312 extends inwardly from the two short-sides 3112, respectively along the direction X. Further, each of the helical wound springs 312 includes a first convolute segment 3121 extending from the ring plane lamina 311, a second convolute segment 3122 extending from the first convolute segment 3121 and a positioning segment 3123 extending from the second convolute segment 3122. Furthermore, a width H1 of first convolute segment 3121 is gradually reduced from an end connecting with the ring plane lamina 311 to the other end of first convolute segment 3121 connecting with the second convolute segment 3122. However, a width H2 of second convolute segment 3122 is gradually increased from an end extending from the first convolute segment 3121 to another end of second convolute segment 3122 connecting with the positioning segment 3123. The third positioning segment 3123 is provided in a central position of the helical wound springs 312.

The weight 21 is substantially a rectangular configuration which has a receiving hole 211 in a central position thereof for accommodating the yoke 22, a plurality of recesses 212 provided at corners of the weight 21 corresponding to the helical wound springs. Each recess 212 receives a supporting protrusion 213 extending from a bottom surface of the recess 212 for connecting with the third positioning segment 3123 of the spring-plate. In the present embodiment, the bottom surface of the recess 212 is lower than an upper surface of weight 21. In a word, the recess 212 is a groove. Alternatively, the bottom surface of the recess may be coplanar with the upper surface of the weight, and in this case, the supporting protrusion 213 extends directly from the upper surface of the weight 21.

In the present embodiment, the structures of the first spring-plate 31 and the second spring-plate 32 shown in FIG. 1 are the same. Somewhat differently, from a top view, the two helical wound springs 312 of the first spring-plate 31 are arranged at one of the diagonals thereof, and the two helical wound springs 322 of the second spring-plate 32 are arranged at another diagonal. That is to say, the two helical wound springs 312 of the first spring-plate 31 are provided along the direction X, and the two helical wound springs 322 of the second spring-plate 32 are provided along the other diagonal direction Y. The direction X of the first spring-plate 31 is cross with the diagonal direction Y of the second spring-plate 32. Accordingly, the weight 21 is interposed between the first spring-plate 31 and the second spring-plate 32. Four recesses are located on the weight 21. Specifically, two recesses 212a are located on a top surface of the weight 21 for anchoring corresponding two helical wound springs 312 of the first spring-plate 31, and two recesses 212b are located on a bottom surface opposite to the top surface of the weight 21 for anchoring the second spring-plate 32.

Figure 4:
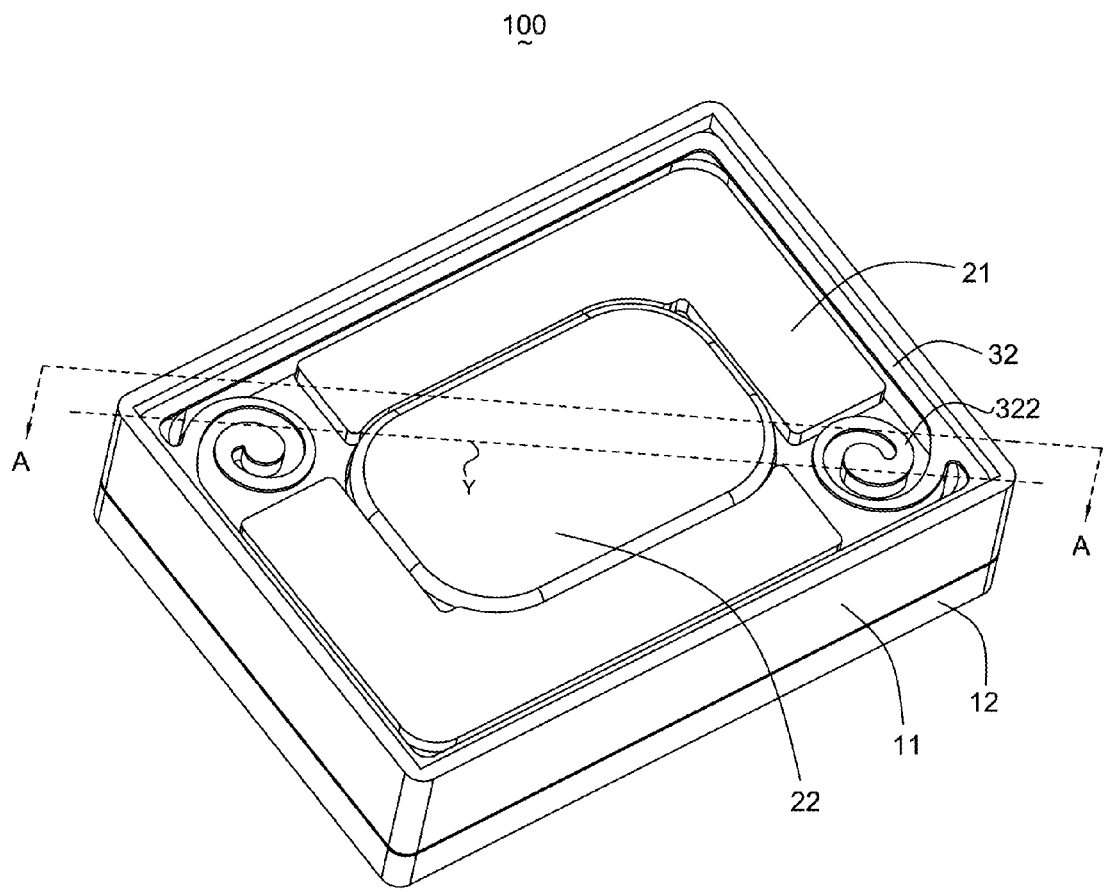
FIG. 4 is an isometric assembled view of the electromagnetic transducer in FIG. 1, from another aspect.
Figure 5:
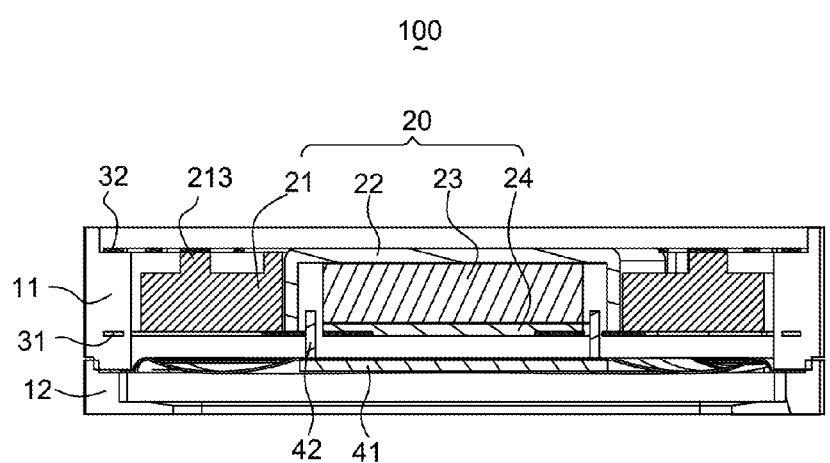
FIG. 5 is a cross-sectional view of the electromagnetic transducer take along line A-A in FIG. 4.

Referring to FIGS. 4 through 5, while assembled, the elastic element 30 is attached to the bracket 11 by the ring plane lamina, and the four helical wound springs 312, 322 are attached to corresponding the supporting protrusions 213 of the weight 21 so as to suspend the magnetic circuit part 20 in the cavity 13 of the bracket 11. A center axis of helical wound spring is parallel to the vibrating direction of the magnetic circuit part 20. The helical wound springs can improve elasticity on a horizontal plane so as to protect the electromagnetic transducer 100 from being damaged during falling off Therefore, the deformation along the vibrating direction, which is perpendicular to the pole plate, causes the vibration of the vibrating unit. The deformation along the direction perpendicular to the vibrating direction can protect the magnetic circuit part 20 from dashing against other components during falling off. Therefore, the elastic element 30 could make the magnetic circuit part 20 generate more sensitive vibration and increase the vibrating amplitude of the vibrating unit.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An electromagnetic transducer, comprising:
a bracket;
a magnetic circuit part receiving in the bracket and including a weight;
a voice generating part actuated by the magnetic circuit part for generating sound;
an elastic element assembled to the bracket for suspending the magnetic circuit part in the bracket; wherein
the elastic element includes two spring-plates sandwiching the weight therebetween, each of the spring-plates defining a ring plane lamina and a plurality of helical wound springs extending inwardly from the ring plane lamina, the helical wound springs deforming along a direction parallel to a vibrating direction of the magnetic circuit part; and wherein
the weight includes a plurality of supporting protrusions for anchoring corresponding helical wound springs.

2. The electromagnetic transducer as described in claim 1, wherein each of the helical wound springs includes a first convolute segment extending from the ring plane lamina, a second convolute segment extending from the first convolute segment and a positioning segment extending from the second convolute segment for anchoring the supporting protrusion.

3. The electromagnetic transducer as described in claim 2, wherein a width of the first convolute segment is gradually reduced from an end extending from the ring plane lamina to another end of first convolute segment connecting to the second convolute segment, and a width of second convolute segment is gradually increased from an end extending from the first convolute segment to another end of second convolute segment connecting to the positioning segment.

4. The electromagnetic transducer as described in claim 3, wherein the positioning segment is located in a central position of the helical wound spring.

5. The electromagnetic transducer as described in claim 3, wherein the ring plane lamina has a rectangular outside shape which has two long-sides and two short-sides, and a plurality of helical wound springs locate at corners of the ring plane lamina.

6. The electromagnetic transducer as described in claim 5, wherein each of the spring-plates includes two helical wound springs arranged along a diagonal direction of the ring plane lamina, respectively.

7. The electromagnetic transducer as described in claim 6, wherein the two helical wound springs of one of the two spring-plates are provided at one diagonal direction, the two helical wound springs of the other of two spring-plates are provided at other diagonal direction.

8. The electromagnetic transducer as described in claim 7, wherein the weight includes a plurality of recesses for accommodating corresponding supporting protrusions.

9. The electromagnetic transducer as described in claim 8, wherein the recess is a groove.

10. The electromagnetic transducer as described in claim 9, wherein the magnetic circuit part further includes a yoke, a magnet and a pole plate.

11. An electromagnetic transducer, comprising:
a bracket;
a magnetic circuit part receiving in the bracket and including a weight, the weight having a rectangular outside shape which has a plurality of supporting protrusions located at the corner of the weight;
a voice generating part actuated by the magnetic circuit part for generating sound;

an elastic element assembled to the bracket for suspending the magnetic circuit part in the bracket, and including a first spring-plate and a second spring-plate, the first spring-plate and the second spring-plate mounted on both sides of the weight, respectively, each of the first and second spring-plates defining a ring plane lamina and two helical wound springs extending inwardly from the ring plane lamina for anchoring corresponding supporting protrusions so as to deform along a direction parallel to a vibrating direction of the magnetic circuit part.

12. The electromagnetic transducer as described in claim 11, wherein each of the helical wound springs includes a first convolute segment extending from the ring plane lamina, a second convolute segment extending from the first convolute segment and a positioning segment extending from the second convolute segment for anchoring the supporting protrusion.

13. The electromagnetic transducer as described in claim 12, wherein a width of first convolute segment is gradually reduced from an end extending from the ring plane lamina to another end of first convolute segment connecting to the second convolute segment, and a width of second convolute segment is gradually increased from another end extending from the first convolute segment to the terminal end of second convolute segment connecting to the positioning segment.

14. The electromagnetic transducer as described in claim 13, wherein the positioning segment is located in a central position of the helical wound spring.

15. The electromagnetic transducer as described in claim 13, wherein the ring plane lamina has a rectangular outside shape which has two long-sides and two short-sides, and the two helical wound springs locate at corners of the ring plane lamina.

16. The electromagnetic transducer as described in claim 15, wherein the two helical wound springs arrange along a diagonal direction of the ring plane lamina, respectively.

17. The electromagnetic transducer as described in claim 16, wherein the two helical wound springs of the first spring-plate are provided at one diagonal direction, and the two helical wound springs of the second spring-plate are provided at other diagonal direction.

18. The electromagnetic transducer as described in claim 17, wherein the weight includes a plurality of recesses for accommodating corresponding supporting protrusions.

19. The electromagnetic transducer as described in claim 18, wherein the recess is a groove.

20. The electromagnetic transducer as described in claim 19, wherein the magnetic circuit part further includes a yoke, a magnet and a pole plate.

* * * * *